United States Patent
Huang

(10) Patent No.: US 12,407,288 B2
(45) Date of Patent: Sep. 2, 2025

(54) METHOD OF CONTROLLING INPUT VOLTAGE

(71) Applicant: JIANGSU DONGCHENG TOOLS TECHNOLOGY CO., LTD., Jiangsu (CN)

(72) Inventor: Jianan Huang, Jiangsu (CN)

(73) Assignee: JIANGSU DONGCHENG TOOLS TECHNOLOGY CO., LTD., Nantong (CN)

(*) Notice: Subject to any disclaimer, the term of this patent is extended or adjusted under 35 U.S.C. 154(b) by 194 days.

(21) Appl. No.: 18/148,447

(22) Filed: Dec. 30, 2022

(65) Prior Publication Data

US 2023/0135870 A1    May 4, 2023

Related U.S. Application Data

(63) Continuation of application No. PCT/CN2022/098285, filed on Jun. 11, 2022.

(30) Foreign Application Priority Data

Jun. 28, 2021  (CN) .......................... 202110717245.6

(51) Int. Cl.
| | |
|---|---|
| H02P 23/26 | (2016.01) |
| H02P 25/10 | (2006.01) |
| H02P 27/08 | (2006.01) |

(52) U.S. Cl.
CPC ............ *H02P 23/26* (2016.02); *H02P 25/107* (2013.01); *H02P 27/085* (2013.01)

(58) Field of Classification Search
CPC ....... H02P 23/26; H02P 25/107; H02P 27/085
(Continued)

(56) References Cited

U.S. PATENT DOCUMENTS 3,872,364 A * 3/1975 Hubner ................ H02P 25/024
                                                    318/400.08
4,079,307 A * 3/1978 Hazumi ................ H02P 9/305
                                                    363/28
(Continued)

FOREIGN PATENT DOCUMENTS

| CN | 105071641 A | 11/2015 |
|---|---|---|
| CN | 105729413 A | 7/2016 |

(Continued)

OTHER PUBLICATIONS

International Search Report and Written Opinion of PCT Patent Application No. PCT/CN2022/098285 issued on Aug. 25, 2022.
(Continued)

*Primary Examiner* — Kawing Chan

(57) ABSTRACT

An input voltage control method includes: a power supply, a first rectifier circuit and a second rectifier circuit connected between the positive terminal and the negative terminal of the power supply. The first rectifier circuit and the second rectifier circuit are connected in parallel with each other, an output end of the first rectifier circuit is connected to the motor via a driver circuit. An output end of the second rectifier circuit is connected to a controller through a voltage detection circuit. The controller collects a bus current value and collects a bus voltage value. The controller stores a target duty cycle value and a target voltage value. The controller determines a corresponding target voltage value based on the collected bus current value and obtains an output control duty cycle to drive the motor.

18 Claims, 4 Drawing Sheets

(58) Field of Classification Search
USPC ........................................................ 318/729
See application file for complete search history.

(56) References Cited

U.S. PATENT DOCUMENTS

| | | | | |
|---|---|---|---|---|
| 4,527,663 | A | * | 7/1985 | Nomura ................... H02P 5/74 307/77 |
| 2003/0067793 | A1 | | 4/2003 | Shimazaki et al. |
| 2010/0115853 | A1 | * | 5/2010 | Gebhart ................... H02P 6/28 49/506 |
| 2010/0117578 | A1 | * | 5/2010 | Hollenbeck ........... E05F 15/668 318/461 |
| 2012/0086374 | A1 | * | 4/2012 | Arisawa ............... H03K 17/102 318/400.32 |
| 2012/0139487 | A1 | * | 6/2012 | Kim ....................... H02M 1/12 320/109 |
| 2021/0313915 | A1 | * | 10/2021 | Maedako ............... H02P 9/305 |

FOREIGN PATENT DOCUMENTS

| | | | |
|---|---|---|---|
| CN | 205610209 U | | 9/2016 |
| CN | 106998133 A | | 8/2017 |
| CN | 108233784 A | | 6/2018 |
| CN | 110165630 A | | 8/2019 |
| CN | 209327439 U | * | 8/2019 |
| CN | 111817584 A | | 10/2020 |
| CN | 212258805 U | * | 12/2020 |
| CN | 113193792 A | | 7/2021 |

OTHER PUBLICATIONS

1st Office Action of counterpart Chinese Patent Application No. 202110717245.6 issued on Aug. 6, 2021.

* cited by examiner

METHOD OF CONTROLLING INPUT VOLTAGE

CROSS REFERENCE TO RELATED APPLICATIONS

The present application is a continuation-application of the International Patent Application No. PCT/CN2022/098285, which claims the priority of Chinese Patent Application No. 202110717245.6, filed on Jun. 28, 2021, and the contents of which are incorporated herein by its entirety.

TECHNICAL FIELD

The present disclosure relates to the technical field of motor controlling, and more particularly, to a method of controlling an input voltage of a brushless motor.

BACKGROUND

An alternating-current brushless circuit in the art is configured with a large electrolyte capacitor. The large electrolyte capacitor allows a motor to be controlled easily. However, the large electrolyte capacitor is usually large-sized, and a size of a circuit board may be increased. Therefore, for a conventional solution, the brushless circuit may not be configured with the large electrolyte capacitor to reduce the size of the circuit board, and the circuit board may have a long service life. However, since this type of circuit is not configured with the large electrolyte capacitor but configured with a capacitor having a small capacitance, a voltage of a bus after rectification may change as a load current changes. Usually, a controller needs to collect the voltage after the rectification and control the voltage to allow a voltage input to the motor to be stable. However, the change of the voltage after rectification affects a control effect of the brushless motor. In addition, since a non-polarity capacitor is configured, the voltage may fluctuate after the rectification, such that the voltage input to the motor may fluctuate, which may easily trigger current protection.

Therefore, it is necessary to provide a method of controlling an input voltage of a motor, allowing the motor to operate stably and to have a better control effect.

SUMMARY OF THE DISCLOSURE

To overcome defects in the related art, the present disclosure aims to provide a motor control circuit that allows the motor to operate stably and to have a better control effect.

According to a first aspect, a method of controlling an input voltage applied to control operation of a motor is provided and includes: a power supply, a first rectifier circuit connected between a positive terminal and a negative terminal of the power supply, and a second rectifier circuit connected between the positive terminal and the negative terminal of the power supply, wherein the first rectifier circuit and the second rectifier circuit are connected in parallel with each other, an output end of the first rectifier circuit is connected to the motor via a driver circuit. An output end of the second rectifier circuit is connected to a controller through a voltage detection circuit. The controller collects a bus current value and collects a bus voltage value $U_{real}$. The controller stores a target duty cycle value $D_{target}$ and a target voltage value $U_{target}$. The controller determines a corresponding target voltage value $U_{target}$ based on the collected bus current value and obtains an output control duty cycle $D_{real}$ based on a formula: $D_{real}=(U_{target}*D_{target})/U_{real}$ to drive the motor to control the input voltage of the motor.

According to a second aspect, a motor control circuit includes: a power supply, a first rectifier circuit connected between a positive terminal and a negative terminal of the power supply, and a second rectifier circuit connected between the positive terminal and the negative terminal of the power supply. The first rectifier circuit and the second rectifier circuit are connected in parallel with each other, an output end of the first rectifier circuit is connected to the motor via a driver circuit. An output end of the second rectifier circuit is connected to a controller through a voltage detection circuit. The controller is configured to: collect a bus current value and collect, based on the voltage detection circuit, a bus voltage value $U_{real}$ output from the second rectifier circuit, wherein the controller stores at least one target duty cycle value $D_{target}$ and at least one target voltage value $U_{target}$; determine a corresponding target voltage value $U_{target}$ from the at least one target voltage value $U_{target}$ based on the collected bus current value and obtain an output control duty cycle $D_{real}$ based on a formula: $D_{real}=(U_{target}*D_{target})/U_{real}$ to drive the motor to control the input voltage of the motor.

According to the present disclosure, two rectifier circuits are arranged, and a bus voltage $U_{real}$ is collected from a rectifier circuit at a front. The controller stores a target duty cycle $D_{target}$ and a target voltage value $U_{target}$. An output control duty cycle $D_{real}$ is determined based on a formula: $D_{real}=(U_{target}*D_{target})/U_{real}$. Further, the motor is driven. In this way, even when the non-polarity capacitor is configured, a relatively stable bus voltage may be collected, and the input voltage of the motor may be stable under different loads.

BRIEF DESCRIPTION OF THE DRAWINGS

Specific embodiments of the present disclosure are described in further detail below by referring to the accompanying drawings.

REFERENCE NUMERALS IN THE DRAWINGS

1, first rectifier circuit; 2, second rectifier circuit; 3, driver circuit; 4, motor; 5, controller; 51, computing module; 52, memory unit; 53, timing unit; 54, PWM generator; 6, driver module; 7, bus current collection unit; 8, filter unit.

DETAILED DESCRIPTION

The present disclosure is described in further detail below by referring to the accompanying drawings and embodiments.

Figure 1:
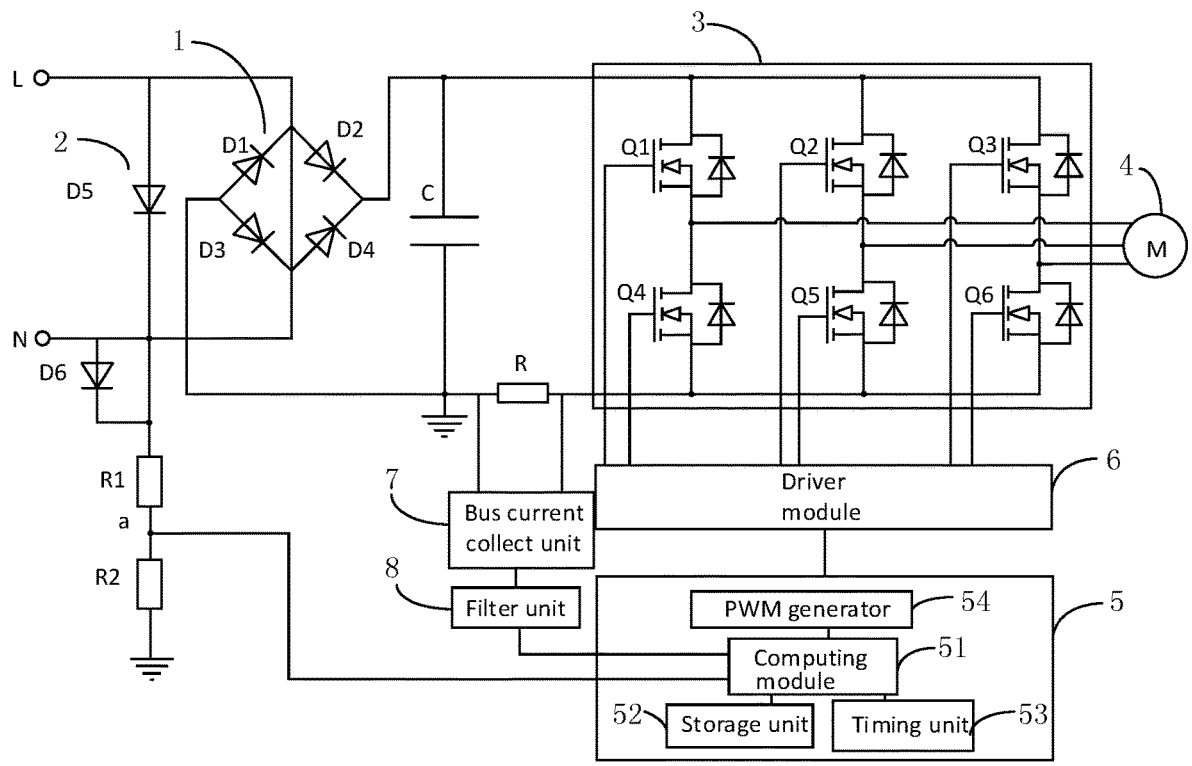
FIG. 1 is a circuit diagram of a method of controlling an input voltage according to an embodiment of the present disclosure.

As shown in FIG. 1, FIG. 1 is a motor control circuit according to an embodiment of the present disclosure. The motor control circuit includes an alternating current (AC) power supply, a first rectifier circuit 1 connected between a positive terminal and a negative terminal of the AC power supply, and a second rectifier circuit 2 connected between the positive terminal and the negative terminal of the AC power supply, wherein the first rectifier circuit 1 and the second rectifier circuit 2 are connected in parallel with each other. An output end of the first rectifier circuit 1 is connected to a motor 4 via a driver circuit 3. An output end of the second rectifier circuit 2 is connected to a controller 5, the controller 5 is connected to the driver circuit 3 via a driver module 6 to drive the motor 4 to operate. The first rectifier circuit 1 is a bridge-type full-wave rectifier circuit formed by four diodes D1, D2, D3 and D4 that are connected end-to-end and are configured for rectification. The positive terminal of the AC power supply is connected to a negative terminal of the diode D1 and a positive terminal of the diode D2. A positive terminal of the diode D1 and a positive terminal of diode D3 are connected with each other and are further connected to the driver circuit 3. A negative terminal of the diode D2 and a negative terminal of the diode D4 are connected with each other and are further connected to the driver circuit 3. The negative terminal of the AC power supply is connected to a negative terminal of the diode D3 and a positive terminal of the diode D4. A capacitor C is connected in parallel with and between the output end of the first rectifier circuit 1 and the driver circuit 3. The capacitor C is connected to the ground. A voltage input from the AC power supply is rectified by the first rectifier circuit 1 in full wave. The voltage, after being full-wave rectified, is input to the driver circuit 3 via the capacitor C. A current sampling resistor R is arranged on a negative bus between the capacitor C and the driver circuit 3 and is connected in series with the capacitor C and the driver circuit 3. A bus current collection unit 7 is connected to two ends of the current sampling resistor R. The bus current collection unit 7 is connected to the controller 5 via a filter unit 8. A bus current value is collected by the current sampling resistor R.

The second rectifier circuit 2 includes the diodes D5 and D6. The diodes D5 and D6 are arranged between and are connected in parallel with the power supply and the first rectifier circuit 1. A negative terminal of the diode D5 and a negative terminal of the diode D6 are connected with each other and are further connected to the controller 5 via a voltage detection circuit.

The voltage detection circuit includes a first resistor R1 and a second resistor R2 connected in series with the first resistor R1. An end of the first resistor R1 is connected to an output end of the second rectifier circuit 2. A point where the first resistor R1 is connected to the second resistor R2 is connected to the controller 5. The other end of the second resistor R2 that is not connected to the first resistor R1 is connected to the ground. Since the voltage detection circuit and the capacitor C connected to the ground constitute an equipotential, the diodes D1 and D3 are shared by the second rectifier circuit 2 and the first rectifier circuit 1. In the present embodiment, the first resistor R1 has a resistance value of 750 KΩ, and the second resistor R2 has a resistance value of 6.8 KΩ. That is, the voltage collected at a point a by the voltage detection circuit is a voltage value of the second resistor R2, such that an output voltage of the second rectifier circuit 2 is within a voltage range that can be detected by the controller 5.

The driver circuit 3 includes an upper bridge arm and a lower bridge arm. The upper bridge arm includes switch tubes Q1, Q2, and Q3. The lower bridge arm includes switch tubes Q4, Q5, and Q6. Each switch tube is connected reversely and in parallel with a diode. The motor 4 is a brushless motor and includes three phase windings. Each of the three phase windings is connected to a connection point of the upper bridge arm and a connection point of the lower bridge arm. The switch tubes Q1 to Q6 are configured to control the three phase windings to be connected or disconnected, such that the voltage input to the motor 4 is controlled.

Figure 2:
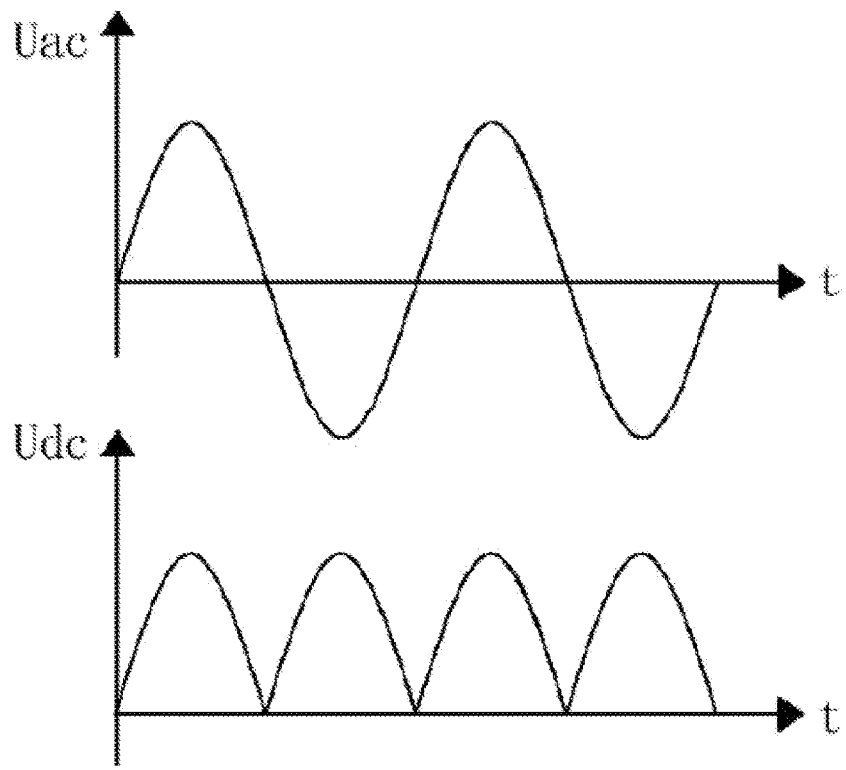
FIG. 2 shows wave patterns of a rectified input voltage and a rectified output voltage of a method of controlling an input voltage according to an embodiment of the present disclosure.

Usually, in order to reduce the size of the circuit board, a capacitor having a small equivalent capacitance value is configured for filtering. For example, in the present embodiment, the capacitor C having an equivalent capacitance value of less than 15 uF is configured. That is, the voltage output from an end of the capacitor C may change as the load changes, resulting in distorted wave patterns. However, by collecting the voltage of the second rectifier circuit, a standard wave pattern of a pulse direct current (DC) bus voltage is obtained. As shown in FIG. 2, a wave pattern Uac is an input voltage of the AC power supply, and a wave pattern Udc is an output voltage that is output from the second rectifier circuit 2 via the voltage detection circuit. The wave pattern Udc corresponds to the bus voltage value in the present disclosure, and does not change as the load changes.

The controller 5 includes a computing module 51, a storage unit 52 connected to the computing module 51, a timing unit 53, and a PWM generator 54. The storage unit 52 stores a target voltage value $U_{target}$ and a target duty cycle $D_{target}$. The computing module 51 samples the bus voltage value and the bus current value, determines a corresponding target voltage value $U_{target}$ based on the bus current value, and obtains an output control duty cycle $D_{real}$ based on a formula: $D_{real}=(U_{target}*D_{target})/U_{real}$. The computing module 51 provides the obtained output control duty cycle $D_{real}$ to the PWM generator 54 and drives the motor 4 to control the input voltage of the motor 4.

The controller 5 stores a plurality of current thresholds and a plurality of target voltage values $U_{target}$. The plurality of current thresholds include a first current threshold, a second current threshold less than or equal to the first current threshold, a current reference value less than the first current threshold and the second current threshold, a first average current threshold, and a second average current threshold greater than the first average current threshold. The plurality of target voltage values $U_{target}$ include a first target voltage value, a second target voltage value, and a third target voltage value. The first target voltage value is greater than the second target voltage value, and the second target voltage value is greater than the third target voltage value.

Figure 3:
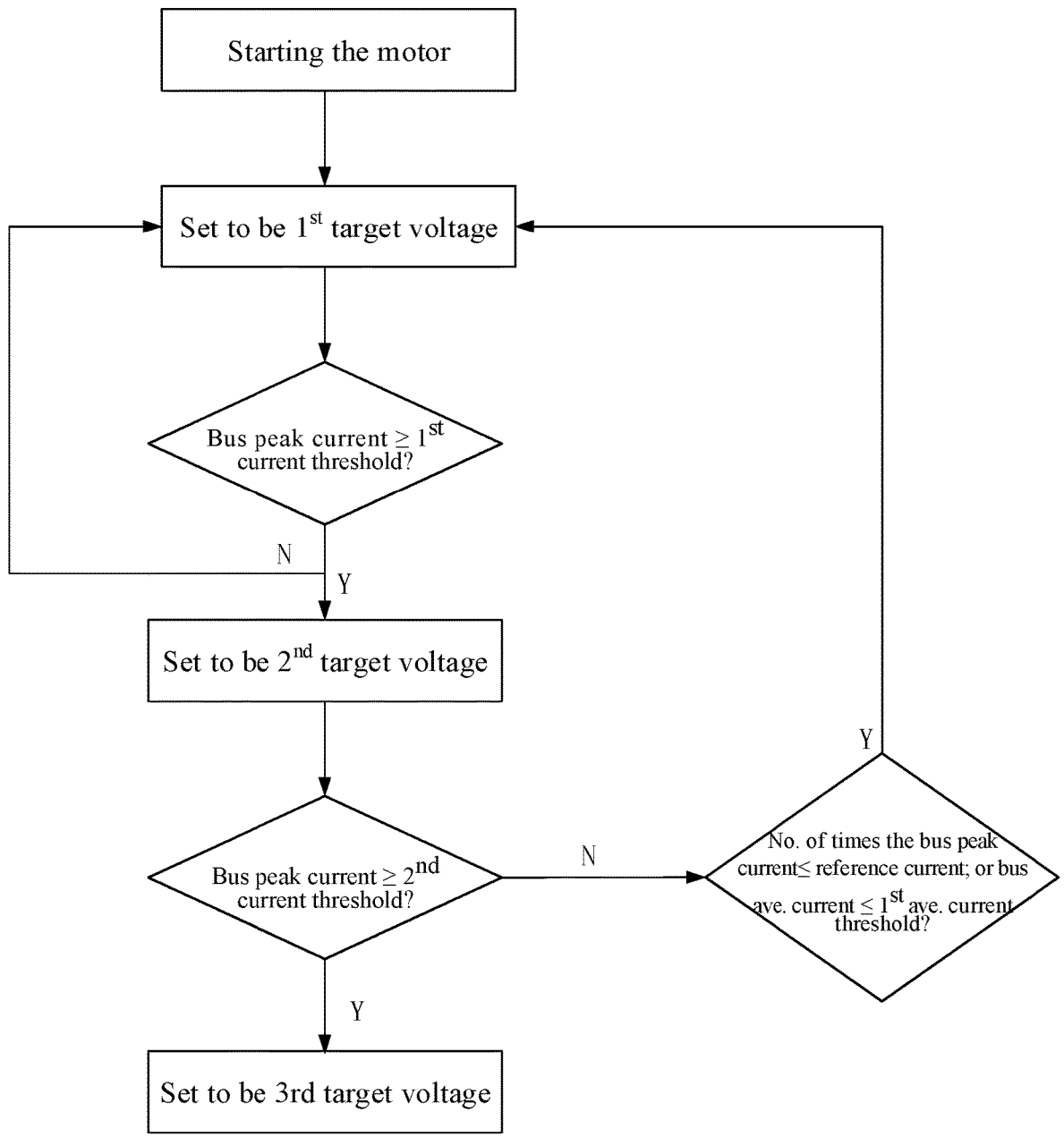
FIG. 3 is a first flow chart of a method of controlling an input voltage according to an embodiment of the present disclosure.

As shown in FIG. 3, FIG. 3 is a first flow chart of a method of controlling an input voltage according to an embodiment of the present disclosure. The controller 5 obtains a bus peak current value and a bus average current value based on the bus current value. The method of controlling the input voltage includes the following. The motor 4 is started. The controller 5 selects the target voltage value $U_{target}$ as the first target voltage value. The controller 5 further collects the bus current to obtain the bus peak current value and the bus average current value. When the bus peak current value is greater than or equal to the first current threshold, the controller 5 adjusts the target voltage value $U_{target}$ from the first target voltage value to the second target voltage value and calculates the output control duty cycle $D_{real}$ based on the second target voltage value to drive the motor 4. When the target voltage value $U_{target}$ is the second target voltage, the controller 5 collects the bus current to obtain the bus peak current value and the bus average current value. When the bus peak current value is greater than or equal to the second current threshold, the controller 5 adjusts the target voltage value $U_{target}$ from the second target voltage value to the third target voltage value and calculates the output control duty cycle $D_{real}$ based on the third target voltage value to drive the motor 4. When the number of times that the bus peak current value is less than or equal to the current reference value within a preset period of time satisfies a preset number or when the bus average current value is less than or equal to the first average current threshold, the controller 5 adjusts the target voltage value $U_{target}$ from the second target voltage value to the first target voltage value.

Figure 4:
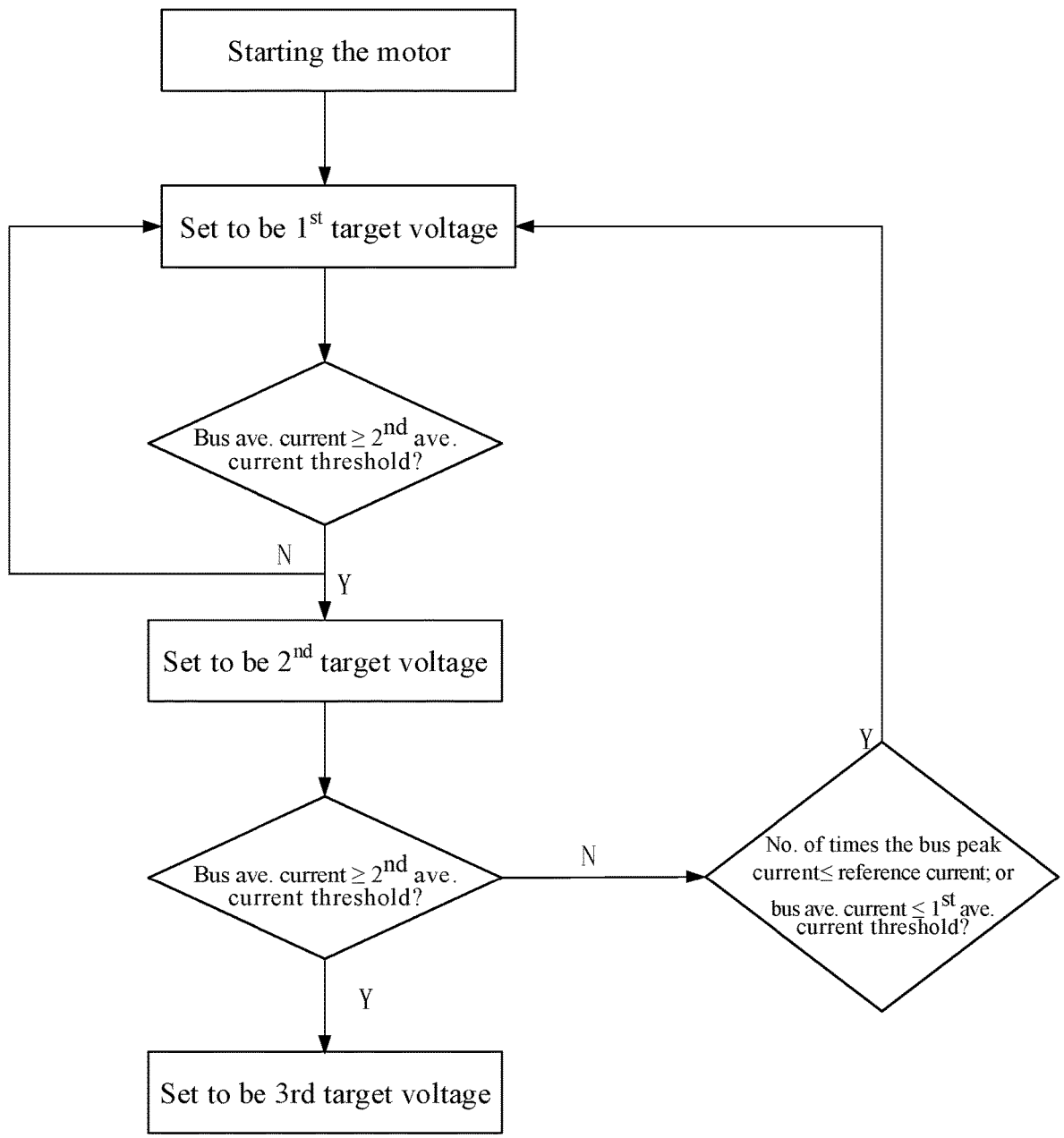
FIG. 4 is a second flow chart of a method of controlling an input voltage according to an embodiment of the present disclosure.

As shown in FIG. 4, FIG. 4 is a second flow chart of a method of controlling an input voltage according to an embodiment of the present disclosure. The controller 5 obtains the bus peak current value and the bus average current value by the bus current value. The method of controlling the input voltage includes the following. The motor 4 is started. The controller 5 determines the target voltage value $U_{target}$ to be the first target voltage value and further collects the bus current to obtain the bus peak current value and the bus average current value. When the bus average current value is greater than or equal to the second average current threshold, the controller 5 adjusts the target voltage value $U_{target}$ from the first target voltage value to the second target voltage value and calculates the output control duty cycle $D_{real}$ based on the second target voltage value to drive the motor 4. When the target voltage value $U_{target}$ is the second target voltage, the controller 5 collects the bus current to obtain the bus peak current value and the bus average current value. When the bus average current value is greater than or equal to the second average current threshold, the controller 5 adjusts the target voltage value $U_{target}$ from the second target voltage value to the third target voltage value, and calculates the output control duty cycle $D_{real}$ based on the third target voltage value to drive the motor 4. When the number of times that the bus peak current value is less than or equal to the current reference value within a preset period of time satisfies a preset number or when the bus average current value is less than or equal to the first average current threshold, the controller 5 adjusts the target voltage value $U_{target}$ from the second target voltage value to the first target voltage value.

For example, in the present embodiment, the AC power input voltage is 220V, the target duty cycle $D_{target}$ is 100%, the first current threshold is 45 A, the second current threshold is 44 A, the first average current threshold is 7 A, the second average current threshold is 12 A, the current reference value is 28 A, the first target voltage value is 310V, the second target voltage value is 280V, and the third target voltage value is 260V. Since the load varies when a device is operating, the device may be controlled by collecting the bus peak current and the bus average current, such that the controlling may be performed more accurately. When the motor 4 is started, when the load is empty or a light load is applied, the controller 5 determines the target voltage value $U_{target}$ as the first target voltage value, which is 310V. That is, the output control duty cycle $D_{real}$ is corresponding to the bus voltage value based on the formula $D_{real}=(U_{target}*D_{target})/U_{real}$. When a heavy load is applied, the bus current increases sharply. When the bus peak current value is greater than or equal to the first current threshold value, such as greater than 45 A, or when the bus average current value is greater than or equal to the second average current threshold, such as greater than or equal to 12 A, the controller adjusts the target voltage value $U_{target}$ to be the second target voltage value 280 V, and that is, the output control duty cycle $D_{real}$ corresponds to the bus voltage value based on the formula $D_{real}=(U_{target}*D_{target})/U_{real}$. In other embodiments, the above-mentioned bus peak current value and the bus average current value may both be satisfied, and subsequently, the target voltage value $U_{target}$ is changed. Further, the load is further increased. When the bus peak current value is greater than or equal to the second current threshold, such as greater than or equal to 44 A, or when the bus average current value is greater than or equal to the second average current threshold, such as greater than or equal to 12 A, the controller 5 adjusts the target voltage value $U_{target}$ from the second target voltage value 280 V to the third target voltage value 260 V and calculates the output control duty cycle $D_{real}$ based on the third target voltage value. In other embodiments, the bus peak current value and bus average current value may both be satisfied, and subsequently, the target voltage value $U_{target}$ is changed, to drive the motor 5. When the number of times that the bus peak current value is less than or equal to the current reference value within the preset period of time satisfies the preset number, such as less than or equal to 28 A, or when the bus average current value is less than or equal to the first average current threshold, such as less than or equal to 7 A, the controller adjusts the target voltage value $U_{target}$ from the second target voltage value 280 V to the first target voltage value 310 V. In other embodiments, the current reference value and the bus average current value may both be satisfied, and subsequently, the target voltage value $U_{target}$ is changed to drive the motor 5. In other embodiments, the plurality of current thresholds further include a third current threshold, a fourth current threshold, . . . , an N-th current threshold, and correspondingly, a fourth target voltage value, a fifth target voltage value, . . . , and an N-th target voltage value. These values may be taken successively and cyclically to perform the controlling based on the above-mentioned operations. When the current threshold is approaching the current reference value, the current reference value is gradually reduced. The present embodiment refers to operation characteristics of an angle grinder. When the load increases, the target voltage value gradually decreases, and that is, a power of the motor is gradually reduced to ensure that the current may not increase sharply, preventing the current protection from being triggered under normal operation circumstances and preventing affecting the working experience. When the motor is applied with different loads, the driver circuit 3 may output a stable output voltage. Therefore, the three-phase windings of the motor 4 has a stable input voltage, ensuring that the motor 4 has a stable speed, preventing current protection from being triggered by a sudden increase in the current. In addition, the output voltage of the second rectifier circuit 2 is collected, and the collected output voltage is not affected by the load, and the accuracy of motor control is improved.

Figure 5:
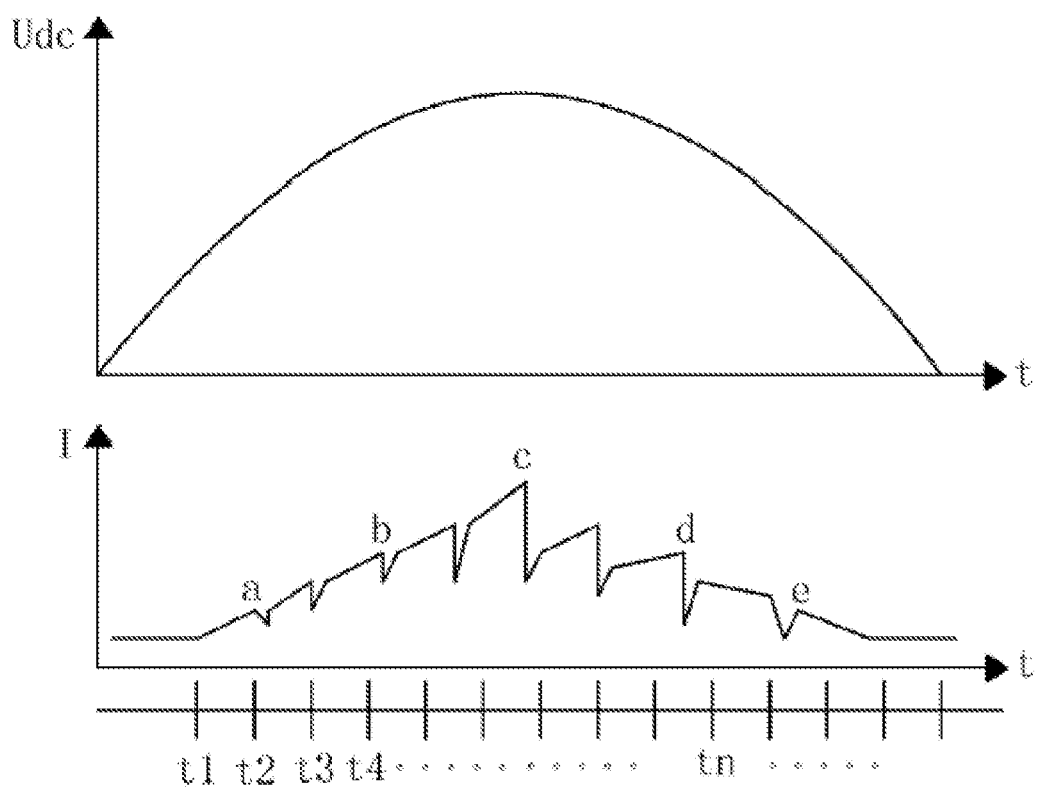
FIG. 5 shows wave patterns a bus voltage and a bus current of a method of controlling an input voltage according to an embodiment of the present disclosure.

The bus peak current is sampled in the following manner. FIG. 5 shows a wave pattern of half a cycle of the bus voltage and a wave pattern of half a cycle of the bus current. The bus peak current value is collected at a specific point in each PWM cycle within the half-cycle, such as at the beginning or the end, or at a time point of changing the phase. As shown in FIG. 5, a highest point of the sawtooth is the bus peak current value (such as at points a, b, c, d, and e). Further, each collected bus peak current value is compared to the current threshold stored in controller 5. The bus average current value is sampled as follows. Bus currents are sampled at equal time intervals, such as sampled at the time points t1, t2, and so on, as shown in FIG. 5. Further, a software filtering process, such as averaging filtering, sliding filtering, and so on, is performed on the sampled bus currents to obtain the bus average current value.

According to the method of controlling the motor input voltage provided in the present disclosure, two rectifier circuits are configured, and the bus voltage $U_{real}$ is collected from the rectifier circuit at the front. The controller stores the target duty cycle value $D_{target}$ and the target voltage value $U_{target}$, and obtains the output control duty cycle $D_{real}$ based on the formula: $D_{real}=(U_{target}*D_{target})/U_{real}$ to drive the motor. In this way, even when the non-polarity capacitor is configured, a relatively stable bus voltage may be collected, and the input voltage of the motor may be stabilized under different loads.

The present disclosure is not limited to the specific embodiments described above. Any ordinary skilled person in the art shall understand that there are many other alternatives for the method of controlling the input voltage, without departing from the principles and scope of the present disclosure. The scope of the present disclosure is governed by the content of the claims.

What is claimed is:

1. A method of controlling an input voltage, applied to control operation of a motor, the method performed by a motor control circuit, the motor control circuit comprising: a power supply, a first rectifier circuit connected between a positive terminal and a negative terminal of the power supply, and a second rectifier circuit connected between the positive terminal and the negative terminal of the power supply,
    wherein the first rectifier circuit and the second rectifier circuit are connected in parallel with each other, an output end of the first rectifier circuit is connected to the motor via a driver circuit;
    an output end of the second rectifier circuit is connected to a controller through a voltage detection circuit; and
    wherein the method comprises:
        collecting, by the controller, a bus current value; and collecting, by the controller based on the voltage detection circuit, a bus voltage value $U_{real}$ output from the second rectifier circuit, wherein the controller stores at least one target duty cycle value $D_{target}$ and at least one target voltage value $U_{target}$;
        determining, by the controller, one of the at least one target voltage value $U_{target}$ based on the collected bus current value to obtain an output control duty cycle $D_{real}$ based on a formula:
        $D_{real}=(U_{target}*D_{target})/U_{real}$ to drive the motor to control the input voltage of the motor;
    wherein a capacitor is connected in parallel with and between the output end of the first rectifier circuit and the driver circuit, both the voltage detection circuit and the capacitor are connected to the ground, the first rectifier circuit comprises four diodes, and two diodes of the second rectifier circuit and two diodes of the four diodes in the first rectifier circuit are shared by the second rectifier circuit and the first rectifier circuit.

2. The method according to claim 1, wherein the voltage detection circuit comprises a first resistor and a second resistor connected in series with the first resistor, an end of the first resistor is connected to an output end of the second rectifier circuit, and a point where the first resistor is connected to the second resistor is connected to the controller, the other end of the second resistor that is not connected to the first resistor is connected to the ground.

3. The method according to claim 2, wherein a current sampling resistor is arranged between the capacitor and the driver circuit, and the controller collects the bus current value through the current sampling resistor.

4. The method according to claim 1, wherein the at least one target voltage value $U_{target}$ comprise a plurality of target voltage values $U_{target}$, the controller stores a plurality of current thresholds and the plurality of target voltage values $U_{target}$;
    the plurality of current thresholds comprise a first current threshold, a second current threshold less than or equal to the first current threshold, a current reference value less than the first current threshold and the second current threshold, and a first average current threshold; and
    the plurality of target voltage values $U_{target}$ comprise a first target voltage value, a second target voltage value, and a third target voltage value, the first target voltage value is greater than the second target voltage the value, and the second target voltage value is greater than the third target voltage value.

5. The method according to claim 4, wherein the controller obtains a bus peak current value and a bus average current value by the bus current value, and the method further comprises:
    starting the motor; selecting, by the controller, the target voltage value $U_{target}$ as the first target voltage value;
    collecting, by the controller, the bus current to obtain the bus peak current value and the bus average current value; adjusting, by the controller, the target voltage value $U_{target}$ from the first target voltage value to the second target voltage value in response to the bus peak current value being greater than or equal to the first current threshold; calculating, by the controller, the output control duty cycle $D_{real}$ based on the second target voltage value to drive the motor.

6. The method according to claim 5, further comprising:
    collecting, by the controller, the bus current to obtain the bus peak current value and the bus average current value in response to the target voltage value $U_{target}$ being the second target voltage value;
    adjusting, by the controller, the target voltage value $U_{target}$ from the second target voltage value to the third target voltage value in response to the bus peak current value being greater than or equal to the second current threshold, and calculating, by the controller, the output control duty cycle $D_{real}$ based on the third target voltage value to drive the motor.

7. The method according to claim 6, further comprising:
    adjusting, by the controller, the target voltage value $U_{target}$ from the second target voltage value to the first target voltage value in response to the number of times that the bus peak current value is less than or equal to the current reference value within a preset period of time meeting a preset number and/or in response to the bus average current value being less than or equal to the first average current threshold.

8. The method according to claim 1, wherein the at least one target voltage value $U_{target}$ comprise a plurality of target voltage values $U_{target}$, the controller stores a plurality of current thresholds and the plurality of target voltage values $U_{target}$;
    the plurality of current thresholds comprise a current reference value, a first average current threshold, a second average current threshold greater than the first average current threshold; and the plurality of target voltage values $U_{target}$ comprise a first target voltage value, a second target voltage value, and a third target voltage value; and the first target voltage value is greater than the second target voltage value, and the second target voltage value is greater than the third target voltage value.

9. The method according to claim 8, wherein the controller obtains a bus peak current value and a bus average current value by the bus current value, and the method further comprises:

starting the motor; determining, by the controller, the target voltage value $U_{target}$ as the first target voltage value;

collecting, by the controller, the bus current to obtain the bus peak current value and the bus average current value; adjusting, by the controller, the target voltage value $U_{target}$ from the first target voltage value to the second target voltage value in response to the bus average current value being greater than or equal to the second average current threshold; calculating, by the controller, the output control duty cycle $D_{real}$ based on the second target voltage value to drive the motor.

10. The method according to claim 9, further comprising:
collecting, by the controller, the bus current to obtain the bus peak current value and the bus average current value in response to the target voltage value $U_{target}$ being the second target voltage value;

adjusting, by the controller, the target voltage value $U_{target}$ from the second target voltage value to the third target voltage value in response to the bus average current value being greater than or equal to the second average current threshold, and calculating, by the controller, the output control duty cycle $D_{real}$ based on the third target voltage value to drive the motor.

11. The method according to claim 10, further comprising:

adjusting, by the controller, the target voltage value $U_{target}$ from the second target voltage value to the first target voltage value in response to the number of times that the bus peak current value is less than or equal to the current reference value within a preset period of time meeting a preset number and/or in response to the bus average current value being less than or equal to the first average current threshold.

12. The method according to claim 1, wherein the controller is connected to the driver circuit via a driver module, the driver circuit comprises six switch tubes, and the six switch tubes are controlled to be connected and disconnected to change the input voltage to the motor.

13. A motor control circuit, comprising: a power supply, a first rectifier circuit connected between a positive terminal and a negative terminal of the power supply, and a second rectifier circuit connected between the positive terminal and the negative terminal of the power supply;

wherein the first rectifier circuit and the second rectifier circuit are connected in parallel with each other, an output end of the first rectifier circuit is connected to the motor via a driver circuit;

an output end of the second rectifier circuit is connected to a controller through a voltage detection circuit; and the controller is configured to:
collect a bus current value and collect, based on the voltage detection circuit, a bus voltage value $U_{real}$ output from the second rectifier circuit, wherein the controller stores at least one target duty cycle value $D_{target}$ and at least one target voltage value $U_{target}$;

determine one of the at least one target voltage value $U_{target}$ based on the collected bus current value to obtain an output control duty cycle $D_{real}$ based on a formula: $D_{real}=(U_{target}*D_{target})/U_{real}$ to drive the motor to control the input voltage of the motor;

wherein a capacitor is connected in parallel with and between the output end of the first rectifier circuit and the driver circuit, both the voltage detection circuit and the capacitor are connected to the ground, the first rectifier circuit comprises four diodes, and two diodes of the second rectifier circuit and two diodes of the four diodes in the first rectifier circuit are shared by the second rectifier circuit and the first rectifier circuit.

14. The motor control circuit according to claim 13, wherein the voltage detection circuit comprises a first resistor and a second resistor connected in series with the first resistor, an end of the first resistor is connected to an output end of the second rectifier circuit, and a point where the first resistor is connected to the second resistor is connected to the controller, the other end of the second resistor that is not connected to the first resistor is connected to the ground.

15. The motor control circuit according to claim 14, wherein a current sampling resistor is arranged between the capacitor and the driver circuit, and the controller collects the bus current value through the current sampling resistor.

16. The motor control circuit according to claim 13, wherein the at least one target voltage value $U_{target}$ comprise a plurality of target voltage values $U_{target}$, the controller stores a plurality of current thresholds and the plurality of target voltage values $U_{target}$;

the plurality of current thresholds comprise a first current threshold, a second current threshold less than or equal to the first current threshold, a current reference value less than the first current threshold and the second current threshold, and a first average current threshold; and the plurality of target voltage values $U_{target}$ comprise a first target voltage value, a second target voltage value, and a third target voltage value, the first target voltage value is greater than the second target voltage the value, and the second target voltage value is greater than the third target voltage value.

17. The motor control circuit according to claim 16, wherein the controller is configured to obtain a bus peak current value and a bus average current value by the bus current value;

the controller is further configured to:
select the target voltage value $U_{target}$ as the first target voltage value when the motor is started;
collect the bus current to obtain the bus peak current value and the bus average current value; adjust the target voltage value $U_{target}$ from the first target voltage value to the second target voltage value in response to the bus peak current value being greater than or equal to the first current threshold; and calculate, by the controller, the output control duty cycle $D_{real}$ based on the second target voltage value to drive the motor;

collect the bus current to obtain the bus peak current value and the bus average current value in response to the target voltage value $U_{target}$ being the second target voltage value;

adjust the target voltage value $U_{target}$ from the second target voltage value to the third target voltage value in response to the bus peak current value being greater than or equal to the second current threshold;

and calculate the output control duty cycle $D_{real}$ based on the third target voltage value to drive the motor;

adjust the target voltage value $U_{target}$ from the second target voltage value to the first target voltage value in response to the number of times that the bus peak current value is less than or equal to the current reference value within a preset period of time meeting a preset number and/or in response to the bus average current value being less than or equal to the first average current threshold.

18. The motor control circuit according to claim 13, further comprising a driver module, wherein the controller is connected to the driver circuit via the driver module, the driver circuit comprises six switch tubes, and the six switch tubes are configured to change the input voltage to the motor by being controlled to be connected and disconnected.

* * * * *